US011429702B2

United States Patent
Adjaz et al.

(10) Patent No.: US 11,429,702 B2
(45) Date of Patent: *Aug. 30, 2022

(54) METHOD OF VERIFICATION OF A BIOMETRIC AUTHENTICATION

(71) Applicant: Idemia Identity & Security France, Courbevoie (FR)

(72) Inventors: Aghiles Adjaz, Courbevoie (FR); Julien-Paul Keuffer, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 311 days.

This patent is subject to a terminal disclaimer.

(21) Appl. No.: 16/744,702

(22) Filed: Jan. 16, 2020

(65) Prior Publication Data
US 2020/0233943 A1   Jul. 23, 2020

(30) Foreign Application Priority Data
Jan. 22, 2019  (FR) .................................. 1900543

(51) Int. Cl.
*H04L 9/32* (2006.01)
*G06F 21/32* (2013.01)
*H04L 9/40* (2022.01)

(52) U.S. Cl.
CPC ............ *G06F 21/32* (2013.01); *H04L 9/3221* (2013.01); *H04L 9/3231* (2013.01); *H04L 63/0861* (2013.01)

(58) Field of Classification Search
CPC . G06F 21/32; G06F 21/31; H04L 9/32; H04L 9/3221; H04L 9/3231;
(Continued)

(56) References Cited

U.S. PATENT DOCUMENTS 10,127,378 B2 * 11/2018 Toth ...................... H04L 63/083
2012/0204035 A1   8/2012 Camenisch et al.
(Continued)

FOREIGN PATENT DOCUMENTS

WO    WO2018222211 A1    12/2018

OTHER PUBLICATIONS

Correspondence from the French National Institute of Industrial Property Office (INPI—Institute National De La PropriétéIndustrielle) for FR1900543 dated Dec. 2, 2019; Preliminary Research Report of the French National Institute of Industrial Property Office for FR1900543 dated Nov. 26, 2019; and Written Opinion on the Patentability of the Invention issued by the French National Institute of Industrial Property Office for FR1900543.
(Continued)

*Primary Examiner* — Ali S Abyaneh
*Assistant Examiner* — Shaqueal D Wade-Wright
(74) *Attorney, Agent, or Firm* — Womble Bond Dickinson (US) LLP (57) ABSTRACT

A biometric data processing method implemented by a proof entity and a verification entity that are connected. The proof entity has a candidate biometric data, a reference biometric data, cryptographic footprints of the reference biometric data, and the candidate biometric data. The verification entity has a set of cryptographic footprints of reference biometric data of authorized users. The method includes generating the proof entity of a zero-knowledge proof of the fact that the candidate biometric data and the reference biometric data match. Transmitting to the verification entity the zero-knowledge proof of the cryptographic footprints of the candidate biometric data and the reference biometric data. Verifying that the zero-knowledge proof is valid, and the received cryptographic footprint of the reference biometric data belongs to the set of cryptographic footprints of
(Continued)

reference biometric data in the possession of the verification entity.

16 Claims, 2 Drawing Sheets

(58) Field of Classification Search
CPC ... H04L 9/3218; H04L 9/3239; H04L 9/3297; H04L 63/08; H04L 63/0861
See application file for complete search history.

(56) References Cited

U.S. PATENT DOCUMENTS

| | | |
|---|---|---|
| 2015/0318994 A1 | 11/2015 | Walsh et al. |
| 2019/0103971 A1* | 4/2019 | Keuffer ................ H04L 9/3247 |
| 2019/0243956 A1* | 8/2019 | Sheets ................... G06F 16/903 |
| 2020/0145219 A1* | 5/2020 | Sebastian .............. H04L 9/3231 |
| 2021/0406866 A1* | 12/2021 | Quentin ............. G06Q 20/3224 |

OTHER PUBLICATIONS

Chabanne, H., Keuffer, J., Lescuyer, R., 'A Verifiable System for Automated Face Identification', 2016, 2016 International Conference of the Biometrics Special Interest Group (BIOSIG), Gesellschaft Fuer Informatik, pp. 1-5, XP032995276, DOI: 10.1109/BIOSIG.2016.7736907.

Chabanne, H., Keuffer, J., Lescuyer, R., 'Delegating Biometric Authentication with the Sumcheck Protocol', 2016, International Conference On Financial Cryptography and Data Security, IFIP International Federation for Information Processing, Springer International Publishing, pp. 236-244, DOI: 10.1007/97-3-319-45931-8_15.

* cited by examiner

METHOD OF VERIFICATION OF A BIOMETRIC AUTHENTICATION

CROSS-REFERENCE TO RELATED APPLICATIONS

This specification is based upon and claims the benefit of priority from French patent application number FR 1900543 filed on Jan. 22, 2019, the entire contents of which are incorporated herein by reference.

TECHNICAL FIELD OF THE INVENTION

The invention relates to a method of processing biometric data, comprising the comparison between a candidate biometric data and at least one reference biometric data.

In particular, the invention applies to the verification of a biometric authentication implemented by a personal device of an individual and not by a processing unit considered to be trustworthy, such as a government processing unit.

STATE OF THE ART

Already known are identification or authentication plans in which fresh biometric data are acquired on a user (on a "client" device, i.e. a terminal or personal device such as a smartphone), and a trustworthy processing unit, for example a central server of a building which the user wishes to enter, one or more reference biometric data is compared in a database to which it has access.

This scenario has the advantage that the result of the comparison between the biometric data is considered reliable because the comparison is carried out by a trustworthy unit. However, this solution poses a problem of confidentiality of the personal data of the users (who must accept that their data be stored by the central server), and especially presents a serious risk of compromise of the biometrics of all users in the event the database of the central server is hacked.

To avoid this type of problem, an alternative scenario could be considered in which the user would be authenticated or identified directly by means of client equipment and would furnish only the results of that authentication or identification to the server in charge of control.

Thus, a "decentralized" architecture has been proposed in which the reference biometric data of the user remains in his possession (on the personal device) and it is not shared with the central server. The central server assigns a private key to each user, securely stored on the client device. A positive comparison between the reference biometric data and the acquired data makes it possible to activate the signature of a message (by means of its private key) at the central server. This architecture is compliant in terms of personal data of users, but it still has a security vulnerability because an attack on the central server (to obtain one or more keys) could make it possible to falsify messages by associating them with legitimate users without the central server being able to detect them.

In addition, if the comparison is made by a completely personal client such as a smartphone and, therefore capable of being manipulated, the problem is posed of the reliability of the result of authentication or identification, and particularly of the result of the comparison between the biometric data that enabled the user to authenticate or identify himself. Indeed, means must be proposed so that the central server in charge of control can verify that the result is correct, and that the user has not used fraud or error in making the comparison of the biometric data.

Recently a very clever solution was proposed in application FR1759292 in which the use of a well-chosen zero-knowledge proof makes it possible to guarantee the result of the comparison at the user's device, while only giving a role of verification to the equipment in charge of control, a role that does not require knowledge of the biometric data, but only of their cryptographic footprints. It is therefore no longer necessary to transmit the biometric data in any form whatsoever, and respect for the user's privacy is therefore total.

This solution is completely satisfactory in situations such as going through Customs in an airport, but can be improved in a more general application of repetitive access control: indeed, the candidate biometric data must be transmitted in one direction or another (the server and the client device both need to have it), and such transmission could be intercepted and decrypted. This is no problem for a single entry (such as the airport) but could allow identity theft by an attacker in the case of repetitive entries (such as an employee authenticating himself every day to enter the premises of his company).

Consequently, it would be desirable to have a new method of processing biometric data for authentication, delegating the computation to the personal device of the user, that is completely reliable, fast, effective, while totally protecting the privacy of the user.

BRIEF DESCRIPTION OF THE INVENTION

According to a first aspect, the invention relates to a biometric data processing method implemented by a proof entity and a verification entity that are connected;

the proof entity having a candidate biometric data, a reference biometric data, a cryptographic footprint of the reference biometric data, a cryptographic footprint of the candidate biometric data; the verification entity having only a set of cryptographic footprints of reference biometric data of authorized users; the method comprising the steps of:

(a) generation, by data processing means of the proof entity, of a zero-knowledge proof of the fact that the candidate biometric data and the reference biometric data match;

(b) transmission to the verification entity of said zero-knowledge proof of the cryptographic footprint of the candidate biometric data, and of the cryptographic footprint of the reference biometric data;

(c) verification by data processing means of the verification entity that:
  the zero-knowledge proof is valid, and
  the received cryptographic footprint of the reference biometric data belongs to said set of cryptographic footprints of reference biometric data in the possession of the verification entity.

According to other advantageous and nonlimiting characteristics:

the proof entity initially only has the reference biometric data and the cryptographic footprint of the reference biometric data, the method comprising the implementation by the data processing means of the proof entity of a preliminary step (a1) of:
  generation of the candidate biometric data from a biometric trait furnished by biometric acquisition means of the proof entity, and generation of the cryptographic footprint of the candidate biometric data obtained;

step (a1) comprises the time-stamping by the data processing means of the proof entity of the candidate biometric data using a time marker, the cryptographic footprint generated in step (a1) and transmitted in step (b) being that of the time-stamped candidate biometric data;

said time marker is a nonce generated by the data processing means of the verification entity and transmitted to the proof entity;

said zero-knowledge proof of the fact that the candidate biometric data and the reference biometric data match is a zero-knowledge proof of the fact that, given two cryptographic footprints and a time marker, there are reference biometric data and candidate biometric data such that:
  the reference biometric data and the time-stamped candidate biometric data using the given time marker have the given cryptographic footprints for respective cryptographic footprints,
  the reference biometric data and the candidate biometric data match;

The method comprises an implemented prior step (a0) of:
  generation by data processing means of an authority entity of said reference biometric data from a reference biometric trait, and transmission thereof to the proof entity;
  Addition to said set of cryptographic footprints of reference biometric data of authorized users of the cryptographic footprint of the generated reference biometric data;

step (a0) further comprises the generation by the authority entity's data processing means of the cryptographic footprint of said generated reference biometric data, and the transmission thereof to the proof entity; and the retransmission by the proof entity to the verification entity of said generated cryptographic footprint of said generated reference biometric data, in order to add biometric data of authorized users to said set of cryptographic footprints of reference;

the proof entity is personal electronic equipment of an individual who is among the authorized users, such as a mobile terminal or chip card, the reference biometric data stored in the proof entity being that of said individual;

each of said authorized users the proof entity is an electronic device personal to an individual, such as a mobile device or chip card, the reference biometric data stored in the proof entity being that of said individual;

the reference biometric trait from which the reference biometric data is generated in step (a0) is that of the individual having the proof entity;

the zero-knowledge proof is a cryptographic object of the zkSNARK type;

step (a) comprises the preliminary verification that the candidate biometric data and the reference biometric data match; the candidate biometric data and the reference biometric data match if their distance thereof according to a given comparison function is less than a predetermined threshold.

According to a second aspect, a biometric data processing arrangement is proposed comprising a proof entity and a verification entity that are connected, characterized in that:
  the proof entity comprises data processing means configured to generate a zero-knowledge proof of the fact that candidate biometric data and reference biometric data match, and to transmit to the verification entity said zero-knowledge proof, a cryptographic footprint of the candidate biometric data, and a cryptographic footprint of the reference biometric data;
  the verification entity comprises data processing means configured to verify that the zero-knowledge proof received is valid, and that the received cryptographic footprint of the reference biometric data belongs to a set of cryptographic footprints of reference biometric data of authorized users in possession of the verification entity.

According to other advantageous and non-limiting characteristics, the proof entity comprises biometric acquisition means, the data processing means of the proof entity being further configured to generate the candidate biometric data from a biometric trait furnished by the biometric acquisition means and the cryptographic footprint of the obtained candidate biometric data.

According to a third and a fourth aspect, the invention proposes a computer program product comprising code instructions for the execution of a method according to the first aspect of biometric data processing; and a storage means readable by computer equipment on which a computer program product comprises code instructions for executing a method according to the first aspect of biometric data processing.

DESCRIPTION OF THE FIGURES

Other characteristics, purposes and advantages of the present invention will be seen from the following detailed description, with reference to the appended figures provided by way of non-limiting example and in which.

DETAILED DESCRIPTION OF AT LEAST ONE EMBODIMENT OF THE INVENTION

Architecture

Figure 1:
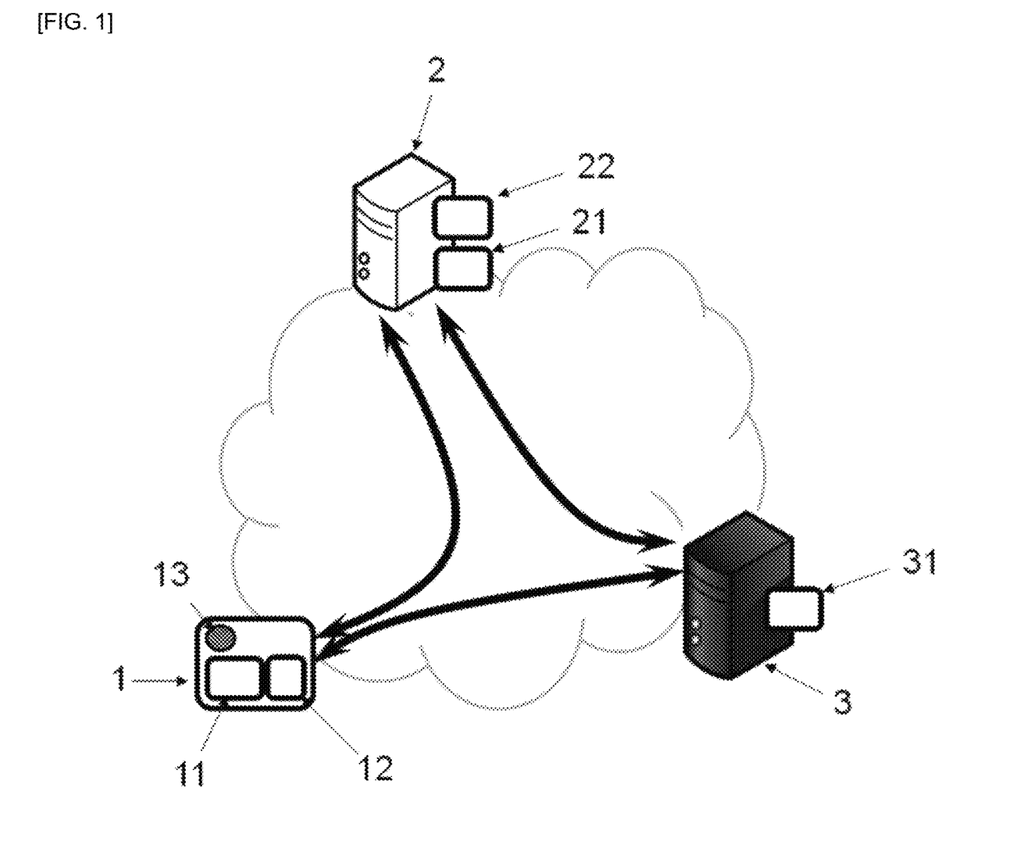
FIG. 1 schematically represents a system for the implementation of the method according to the invention.

With reference to FIG. 1, a system for the biometric authentication of individuals enabling verification of the result of the authentication is represented schematically.

Said system comprises at least two devices 1, 2. The first device 1 is the client device, preferably a device that is personal to an individual such as for example a mobile telephone or "smartphone," a tablet computer, a personal computer or a chip card, as will be explained hereinafter, but it can also be shared equipment such as an access terminal. There may be a plurality of first devices 1, provided they are personal.

The second device 2 is a server owned and controlled by an entity with which the authentication must be carried out, for example a governmental entity, customs, a company, etc. In the following description, the example will be used of an access control server for one or more buildings (for example for a company), but it will be noted that the present method is still usable in very many situations, for example to authenticate an individual wishing to carry out a transaction (the chip card could be a payment card).

As will be seen, in particular, then, it will be considered that there is a list of authorized users (typically the employees of said company).

One of the devices carries out an authentication/identification on biometric data, and then furnishes the result to the other, which proceeds with the verification of said result. In that regard, according to a known plan, the first device 1 is an entity, called proof, which carries out the authentication/ identification and furnishes the result to the second device 2, called verification entity, which verifies said result.

The first device 1 comprises data processing means 11, i.e. a computer such as for example a processor, a microprocessor, a controller, a microcontroller, an FPGA, etc. Said computer is suitable for executing code instructions for implementing the following method. In the embodiment where the first device 1 is a chip card, it can further comprise—in addition to the "chip"—a dedicated processor for more efficiently implementing the processing of the biometric data.

The first device 1 advantageously comprises a communication interface enabling it to dialog remotely with the second device 2 and other devices such as a third device 3 which is called authority entity (for example the workstation of an administrator or government agent). It should be noted that the verification entity 2 and the authority entity 3 can be one and the same, even though it is preferable to separate them in order to limit the risks of fraud.

The first device 1 can also comprise data storage means 12 (a memory, for example, a flash drive), biometric acquisition means 13 (see below), and optionally a user interface (typically a touchscreen).

This communication interface is preferably a wireless communication interface, for example of the Wi-Fi or Bluetooth type or mobile telephone network (GPRS, 3G, 4G or other) or near field communication (NFC) and/or any other downstream communication network.

The second device 2 (and if applicable the third device 3) also comprises data processing means 21 (respectively 31), i.e. a computer such as for example a processor, a microprocessor, a controller, a microcontroller, an FPGA, etc. Said computer is suitable for executing code instructions for implementing the following method. The second device 2 also typically comprises a memory 22.

These other devices 2, 3 advantageously also comprise communication interfaces enabling them to remotely dialog with each other and with the first device 1.

The second device 2 and the third device 3 are typically arranged in proximity (for example in the building to be secured), and can thus be connected by wire, or they can be other remote equipment (for example to control a plurality of sites).

Preferably, the first device 1 is capable of generating biometric data from a biometric trait of an individual. The biometric trait can for example be the shape of the face, a fingerprint, a palm print, an iris of the individual, etc. The extraction of the biometric data is carried out by processing the image of the biometric trait, which depends on the nature of the biometric trait. Methods of processing varied images to extract biometric data are known to the skilled person. By way of non-limiting example, the extraction of the biometric data can comprise an extraction of particular points or a shape of the face in the case where the image is a facial image of the individual.

The first device 1 comprises for such purpose biometric acquisition means 13, typically an image sensor, for example a digital photographic apparatus or a footprint sensor, suitable for acquiring at least one image of a biometric trait of an individual. In the example of FIG. 1, the device 1 is a personal chip card with a digital footprint sensor 13.

In every case, the reference biometric data used for the authentication is advantageously a data pre-recorded in the presence of an authority (see below), or data from an identity document of the individual (image of the face included on an identity document, or a facial image or at least an iris of the individual recorded in a radio frequency chip contained in the document).

It will be noted that the second device 2 never has biometric data of any kind, so as to guarantee the privacy of the users and prevent any risk of leaking personal data even in the case of hacking.

In a preferred embodiment, the device 1 is personal (mobile device or chip card of the individual) and carries out an authentication of the individual, i.e., it compares candidate biometric data, freshly acquired from the individual, to a single biometric called reference, assumed to come from the same individual, in order to verify that the individual from whom both data have been obtained is one and the same. Indeed, preferably the device 1 does not contain the reference biometric data of the individual to whom it belongs. It is assumed that said individual (to whom first device 1 is entrusted for his personal authentication) is among the authorized users, and thus in such an embodiment each authorized user of the system advantageously has his own device 1.

In another embodiment, the device 1 is not personal (for example an access terminal) and carries out identification of the individual, i.e., it compares the candidate biometric data to a plurality of reference biometric data of authorized individuals, so as to determine from which individual the candidate biometric data has been obtained (and if he is authorized). However, it can be provided that the individual states his identity on the device 1 (for example by using a personal chip card), and said equipment then carries out the authentication, i.e. it compares the candidate biometric data only with the reference biometric data associated with the stated individual.

The first embodiment (personal device) will be preferred, insofar as it prevents any risk of leaking of personal information (even if a user's personal device is stolen, at worst his reference biometric data can be accessed, but not that of other users; it is sufficient, then, to renew said reference biometric data in order to continue normal operation with no impact for the other users).

One application is entry through a controlled access gate by an employee at the entrance of a company's building. He can use his personal device to perform a biometric authentication just before entering the building. Then, when he reaches the controlled access gate, he provides the result to the second device 2 acting as verification entity by means of his personal device 1. The verification entity 2 then only proceeds with the verification (for example, if the first device 1 is a chip card, by passing said card near an NFC reader mounted on the gate).

Enrollment

As explained, the present method is intended to ensure that the second device 2 (the verification entity) needs only to have proof of authentication of the individual presented, but not biometric data.

Figure 2:
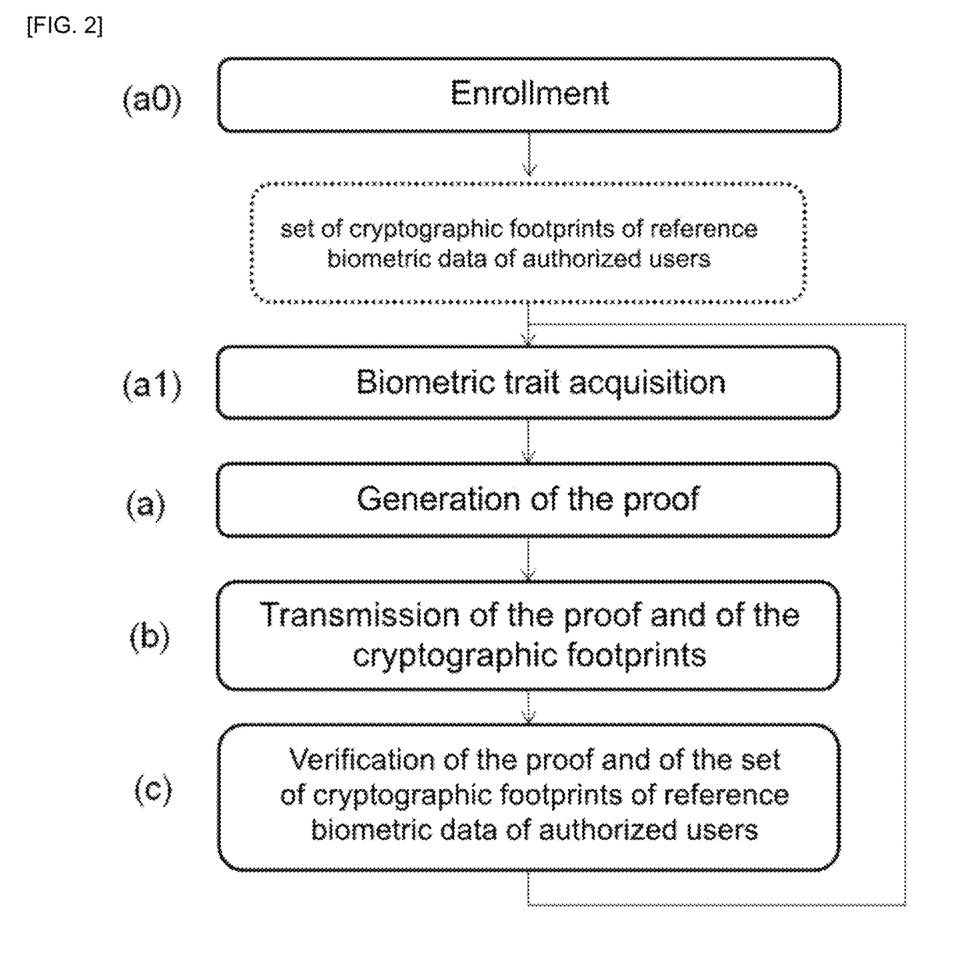
FIG. 2 schematically represents a preferred embodiment of the method according to the invention.

Thus, the basic predicate is that at the start of the method the proof entity (the first device 1) has a candidate biometric data, a reference biometric data, a cryptographic footprint of the reference biometric data, a cryptographic footprint of the candidate biometric data, and that the verification entity (the second device 2) only has a set of cryptographic footprints of reference biometric data of authorized users (stored in the memory 22 thereof).

More specifically, the idea is that the second device 2 has for everyone in a list of authorized users (for example all the employees) the cryptographic footprint of their reference biometric data, so as to establish a forgery-proof index of authorized users, although without disclosing sensitive information in terms of personal data as well as security. More specifically, if for reference data the footprint thereof belongs to said set of footprints, the respective user is authorized. This naturally implies that the user and the entity with which he is identified are in agreement on the reference biometric data, but in practice this poses no problem.

It will be seen that this ingenuity makes it possible to avoid any transfer of "complete" biometric data. In contrast, in the method described in application FR1759292 the second device 2 had to have the cryptographic footprint of the candidate biometric data, and transmission of the candidate biometric data was necessary.

According to a first possibility, the second device 2 has only the set of cryptographic footprints "as such," i.e. none of them is associated with any identity, which guarantees maximum protection of privacy (it is impossible to know which user is authenticated). According to a second possibility, each cryptographic footprint of said set is associated with an unencrypted identity element, for example the name of the person presenting the respective reference biometric data. This possibility is less respectful of privacy but offers an additional level of security because it allows a history of authentications to be established. A third possibility, which is preferred and will be described in more detail hereinafter, consists of associating authorized users with anonymized identifiers by which said set of cryptographic footprints will be referenced. More specifically, it involves a set of pairs of a unique identifier and a cryptographic footprint of reference biometric data. This allows both traceability and respect for privacy.

"Cryptographic footprint" is understood as biometric data (also called "condensate" or "hash" of the data), obtained by applying cryptographic hashing to the data (typically SHA-1 or SHA-2 families, particularly SHA-256). The footprint is of a fixed size and reveals nothing about the data for which it is issued: the biometric data cannot be retrieved from this footprint, in any case as long as the hashing function used is considered secure. However, the footprint can be recalculated from the data in order to verify that it is correct. The footprint of the biometric data can thus be transmitted to any equipment without disclosing information about the data itself and therefore about the privacy of the respective user.

In a preferred embodiment, the method comprises a preliminary "enrollment" step (a0) enabling an individual to be included in the list of authorized users (for example, a new employee), and thus the progressive establishment of said set of cryptographic footprints of reference biometric data, each associated with an authorized user on the second device 2.

This step can be carried out long before the rest of the method, and does not need to be repeated with each occurrence of the method (it should be noted that it can be provided to repeat it from time to time for security and to update the biometrics of the users, but this is optional). Thus, it can be considered that said set of cryptographic footprints of reference biometric data of authorized users is predefined for the implementation of the method.

Typically, this step is initiated at the authority entity 3, and comprises:

The generation by the data processing means 31 of the authority entity 3 of said reference biometric data from a reference biometric trait (in particular that of the individual to whom the proof entity 1 is assigned if said entity is a personal device), and transmission to the proof entity 1 (for storage), as well as the cryptographic footprint of said reference biometric data (again by application of a given hashing function);

The addition of said set of cryptographic footprints of reference biometric data of authorized users (from the verification entity 2) of the cryptographic footprint of the generated reference biometric data.

It is understood that step (a0) comprises a transmission of biometric data (reference data), but inasmuch as this step only needs to be performed once, and then in the presence of an authority, the risk of interception is nearly nil. In order to guarantee total security, physical contact may be required, for example, for transmitting the biometric data, for example if the device 1 is a chip card, by inserting it into a reader.

It should be noted that the cryptographic footprint generated by the authority entity 3 is either also transmitted to the proof entity 1, or the latter generates it directly from the reference biometric data received. Moreover, this step can comprise the generation of a unique identifier of the individual (for association with the cryptographic footprint of the generated reference biometric data).

Furthermore, this step can comprise the transmission to the proof entity of a proof key, assuming that a pair of a proof key and a verification key are pre-generated, which are typically dependent on the verification program and are independent of the biometrics of the users (all users will have the same proof key). The verification key is stored by the verification device 2. It should be noted that said keys are not sensitive and can be public.

Said reference biometric trait can be the one associated with an official document (particularly an identity document such as a passport or an identity card), or an acquired trait acquired directly by biometric acquisition means of the authority entity.

For example, it is conceivable that for enrollment, the new user reports to an administrator, a security officer or a representative of the state who verifies his identity and takes his digital fingerprint as reference biometric trait.

It should be noted that step (a0) can comprise obtaining a signature of the reference biometric data, of the cryptographic footprint thereof, and/or of the respective unique identifier by the authority (again, an administrator for example).

The electronic signature of the data makes it possible to definitively guarantee the integrity thereof (non-repudiation), by analogy with the handwritten signature from a paper document, and it is well known by the person skilled in the art. It is generated by the authority entity 3 and generally consists of an encryption of a print of the object to sign. To do this, the data processing means 31 of the authority entity 3 apply for example an asymmetric encryption function to at least the footprint and retransmit it thus encrypted to the first device 1 as signature.

According to a particularly preferred mode, wherein H is the hashing function and it is assumed that the authority entity 3 has a private signature key $s_k$ and a proof key $ek_f$ and that the verification entity 2 has a public signature key $p_k$ and a verification key $vk_f$ (these latter can be generated at the authority entity 3 and transmitted problem-free to the verification entity 2, since they are not sensitive):

the data processing means 31 of the authority entity sign the pair $(h_{1,j}, id_i)$ composed of the cryptographic footprint $h_{1,j} = H(t_{ref,i})$ of the generated reference data $t_{ref,i}$ and of the respective unique identifier $id_i$, and transmit to the proof entity the pair $(h_{1,i}, id_i)$, the signature $\sigma$ thereof, and the proof key $ek_f$;

the proof entity 1 stores them and returns the three elements $h_{1,i}$, $id_i$, $\sigma$ to the verification entity 2;

the processing means 21 of the verification entity 2 verify the signature σ by means of the public key $p_k$, and if the verification is successful the pair $(h_{1,i}, id_i)$ is added to the set of cryptographic footprints of the reference biometric data of the authorized users.

In general, it will be understood that step (a0) may be implemented in any way that enables the set of cryptographic footprints of the reference biometric data of the authorized users to be established securely, and to provide the respective reference biometric data to the first device 1.

Obtaining the Candidate Biometric Data

A method of authentication/identification implemented by the system described above will now be described.

As was explained, it is assumed that the first device 1 has a candidate biometric data, a reference biometric data, a cryptographic footprint of the candidate biometric data, a cryptographic footprint of the reference biometric data, and optionally a signature of the reference biometric data by a trustworthy authority. As explained, said data can be obtained preliminarily during an enrollment step (a0).

As regards the "fresh" candidate biometric data, it can be obtained during a preliminary step (a1). In other words, the proof entity 1 initially (i.e. upon completion of step (a0)) may only have the reference biometric data and the cryptographic footprint of the reference biometric data.

It is important to understand that although the enrollment step (a0) can be performed weeks before the implementation of the authentication, step (a1) is at worst carried out several minutes prior to the rest of the method, to guarantee the "freshness" of the candidate biometric data.

Step (a1) is carried out by the data processing means 11 of the first device 1 (proof entity) and comprises first the generation of the candidate biometric data from a biometric trait furnished by biometric acquisition means 13 of the proof entity 1.

The cryptographic footprint of the candidate biometric data obtained is then generated. At this stage, the proof entity 1 does not transmit anything to the verification entity 2, let alone any biometric data. Thus, there is nothing to intercept.

Preferably, in order to guarantee the freshness of the candidate data, the step (a1) comprises time stamping the candidate biometric data by means of a timestamp, the generated cryptographic footprint being that of the time-stamped candidate biometric data.

The person skilled in the art will know how to implement such time stamping using known techniques, and advantageously a nonce (number used once) will be used as timestamp.

More specifically, preferably, upon request from the proof entity 1 (for example by sending the unique identifier $id_i$ thereof to it), the data processing means 21 of the verification entity 2 generate a nonce $$\text{Nonce}_{E,1} \in \{0,1\}^l \qquad \text{[Math 1]}$$

and transmit it to the proof entity 1. Then, labelling the acquired candidate biometric data $t_{c,i}$, the data processing means 11 of the proof entity generate the cryptographic footprint $h_{2,i} = H(t_{c,i} \| \text{Nonce}_{B,i})$ of the timestamped candidate biometric data $t_{c,i} \| \text{Nonce}_{B,i}$.

It will be noted that the only elements exchanged are at worst a unique identifier and the nonce, which are not sensitive. It should also be noted that if it is desired to avoid any interactivity, the verification entity 2 can for example broadcast nonces at regular intervals, for example one every minute. One can even envisage the same nonce generator be installed on the proof entity 1 and the verification entity 2 (the two generators being synchronized and using the same secret), so that at a given moment the same nonce is available on both pieces of equipment.

Method of Authentication

The authentication part of the present method is non-interactive, i.e., it only requires "one way" travel of information from the proof entity 1 to the verification entity 2, and not a "round-trip." More importantly, as explained, the verification entity will receive neither the candidate biometric data nor the candidate biometric data [sic] (nor any data that would make it possible to get back to those data), even though it is possible for the verification entity to know with certainty if the candidate and reference biometric data match. Furthermore, all the transmitted data are not sensitive, and could be intercepted without resulting in a problem.

For this purpose, a cryptographic protocol is used, generating a "proof" that the candidate biometric data and reference biometric data match, said proof revealing nothing other than the fact that said biometric data are possessed by the producer of the proof.

The Pinocchio protocol presented in the publication "Bryan Parno, Craig Gentry, Jon Howell, and Mariana Raykova, Pinocchio: Nearly Practical Verifiable Computation, in Proceedings of the IEEE Symposium on Security and Privacy, IEEE, 21 May 2013" was one of the first verifiable computation protocols enabling the performer to verifiably compute the application of any function and the ordering party to verify the associated proof in a computation time less than the time necessary to perform the computation itself.

In a first step (a), the data processing means 11 of the proof entity 1 generate for this purpose a zero-knowledge proof of the fact that the candidate biometric data and the reference biometric data match, advantageously by using the proof key furnished during the enrollment.

More specifically, said zero-knowledge proof guarantees the following affirmation: "given two cryptographic footprints, there are reference biometric data and candidate biometric data having the given cryptographic footprints for respective cryptographic footprints, and matched."

In a case in which a timestamp is used such as a nonce, the zero-knowledge proof more specifically guarantees the following affirmation: "given two cryptographic footprints $h_{1,i}$, $h_{2,i}$ and a nonce $\text{Nonce}_{B,i}$, there are a reference biometric data $t_{ref,i}$ and a candidate biometric data $t_{c,i}$ such that the reference biometric data $t_{ref,i}$ and the candidate biometric data timestamped with the nonce $t_{c,i} \| \text{Nonce}_{B,i}$ for respective cryptographic footprints the given cryptographic footprints, i.e. $h_{1,i} = H(t_{ref,i})$ and $h_{2,i} = H(t_{c,i} \| \text{Nonce}_{B,i})$, and matched."

Thus, the two cryptographic footprints can be tied to the candidate and reference biometric data, but no information can be obtained about the content of said biometric data. The cryptographic protocol gives a proof that is quick to verify (less than half a second) and which cannot be falsified: it is nearly impossible (probability less than $\frac{1}{2}^{80}$, even less than $\frac{1}{2}^{128}$ depending on the parameters chosen for producing the proof, said proof then being slower to produce) so as to accept a proof of the affirmation above if the process is not carried out in accordance with what is specified.

In producing the proof, the proof entity 1 uses the possibility of producing zero-knowledge proofs to conceal the biometric data. Thus, the proof provides no information about the biometric data themselves.

Naturally, step (a) advantageously comprises the prior verification that the candidate biometric data and the reference biometric data match (always on the proof entity 1, i.e. the user's personal device), by comparing the candidate biometric data and the reference biometric data.

Indeed, in a known manner, the candidate biometric data and the reference biometric data match if their distance according to a given comparison function is less than a predetermined threshold.

Thus, the implementation of the comparison comprises the computation of a distance between the data, the definition whereof varies depending on the nature of the biometric data considered. The computation of the distance comprises the computation of a polynomial from the components of the biometric data, and advantageously the calculation of a scaler product.

For example, in the case where the biometric data have been obtained from iris images, a distance conventionally used to compare two data is the Hamming distance. In the case where the biometric data have been obtained from images of the individual face, it is common to use the Euclidean distance.

This type of comparison is known to the person skilled in the art and will not be described in more detail hereinafter.

The individual is authenticated if the comparison reveals a rate of similarity between the candidate data and the reference data exceeding a certain threshold, the definition whereof depends on the calculated distance. Mathematically, $d(t_{ref,i}, t_{c,i}) < \tau$.

The proof is then more precisely a zero-knowledge proof since two cryptographic footprints (and if applicable the nonce) being given, there are candidate biometric data (if applicable, timestamped with the nonce) and reference biometric data having for respective cryptographic footprints the given cryptographic footprints, such that their distance according to the given comparison function is less than a predetermined threshold.

It should be noted that the proof can involve additional public parameters, for example if the purpose of the authentication is a transaction, said parameters could then include an amount of the transaction, an identifier of the merchant, etc.

Generation of Proof

Preferably said zero-knowledge proof is a cryptographic object of the zkSNARK type.

zkSNARK means "zero-knowledge Succinct Non interactive ARgument of Knowledge" i.e., Non-interactive, zero-knowledge argument of knowledge. It concerns a cryptographic primitive constructed around the idea of proof. Researchers in theoretical computer science and cryptography have long been interested in the idea of proof. There are theoretical results with which to produce a very short and secure proof from an algorithm, but the time for producing such proof is unattainable and will remain so in spite of increased computing power of computers. One of the reasons lies in the power given to the entity that produces the proof, the proof entity 1 (also called the prover). In the theoretical results on the proofs, the prover has infinite computing power and the proofs remain secure in spite of this.

The idea of proof has then been relaxed, the protocol seeking only to protect a prover that would have significant but limited computing power. The result of the protocol is no longer a proof but an argument. It is from this idea of argument that practical and verifiable computing systems are constructed. An additional requirement in a system producing an argument is that said argument be non-interactive: the verifier and the prover do not need to interact in order to produce the argument.

zkSNARKs have been produced since 2010: this involves arguments of short size (a few elements of an elliptical curve), which do not need interactivity and which also enable the prover to perform a zero-knowledge proof, i.e. the proof contains no nontrivial information about the inputs furnished by the prover.

There are several protocols that specifically produce zkSNARKs, and the skilled person will be able to use any of them in the present method:

The Pinocchio protocol, already mentioned;

The Gepetto protocol, presented in the publication "Craig Costello, Cedric Fournet, Jon Howell, Markulf Kohlweiss, Benjamin Kreuter, Michael Naehrig, Bryan Parno, and Samee Zahur, Geppetto: Versatile Verifiable Computation, in Proceedings of the IEEE Symposium on Security and Privacy, IEEE, 18 May 2015," which is an improvement on Pinocchio The protocol presented in the publication and following, "Eli Ben-Sasson, Alessandro Chiesa, Daniel Genkin, Eran Tromer, Madars Virza. SNARKs for C: Verifying Program Executions Succinctly and in Zero Knowledge. In Proceedings of the 33rd Annual International Cryptology Conference, CRYPTO '13, pages 90-108, 2013," implemented open source in the form of a library called libsnark, optimizing the protocol producing a zkSNARK in Pinocchio by improving the expressivity, i.e. the type of programs or algorithm that it is possible to verify.

Taking the example of the Pinocchio protocol, this protocol includes several parts:

1. A conventional program is translated in the form of an arithmetic circuit, i.e. a set of relations between the inputs and outputs of the program that are translated solely by means of additions and multiplications of elements of a finite body. It should be noted that in theory all the programs can be translated in this form but only some of these programs allow effective translation in circuit form.

2. The obtained arithmetic circuit is represented effectively by means of three families of polynomials to which an additional polynomial, called target polynomial, is added. These families of polynomials form "Quadratic Arithmetic Programs" (QAPs). They encode the relations between the inputs and outputs of each multiplication gate of the circuit, the relations of the addition gates being integrated into the first multiplication gate that follows in the computation.

These QAPs are related to the verifiable computation by the following point: a computation $y=C(x)$ is correct for an input x if and only if all the relations describing the respective arithmetic circuit are satisfied, setting x as input value and y as output value.

In a sense, the QAPs make it possible to compress all the constraints to be verified into a single relation to be verified: a polynomial constructed from the value x and three families of the QAP must divide the target polynomial.

3. A cryptographic protocol then takes at the input a QAP associated with a program, generates evaluation and verification keys that use elliptical curves to conceal the polynomial relations. The polynomial proving that the computation was performed correctly is then computed directly by means of relations concealed in the elliptical curve. The divisibility relation is translated only by means of a constant number of elements of the elliptical curve, i.e. the proof is of constant size. Verification of this proof is extremely fast.

The protocol also makes it possible to ensure that the inputs of the computation that are furnished by the prover are private: it allows the values of the prover to be concealed in the production of the proof by multiplying them by a multiple of the target polynomial, which does not change the fact that the "proof" polynomial is divisible by the target polynomial.

Said "proof" polynomial, when it is concealed in an elliptical curve, constitutes a zkSNARK.

The Pinocchio protocol allows the one that produces the proof to conceal some of the inputs of the computation for which it is providing the proof. In the present case, it involves producing the following computation:

Input: the cryptographic footprints of the reference $h_{1,i}$ and candidate $h_{2,i}$ biometric data (timestamped if applicable), the result of the comparison of the candidate $t_{c,i}$ and reference $t_{ref,i}$ biometric data (i.e. the Boolean according to which they match or not), if applicable the nonce $Nonce_{B,i}$, and an initialization vector IV (and other public data if needed).

Private input: the candidate $t_{c,i}$ and reference $t_{ref,i}$ biometric data.

Output: the proof $\pi$ that the prover knows well from the biometric data $t_{ref,i}$ and $t_{c,i}$ which are hashed (if applicable when the candidate data are timestamped) as $h_{1,i}$ and $h_{2,i}$ (i.e. $h_{1,i}=H(t_{ref,i})$ and $h_{2,i}=H(t_{c,i}\|Nonce_{B,i})$, and for which the result of the comparison is the one expected.

It should be noted that protocols are known that are intended for generating a proof of successful completion of a hashing function, which a skilled person may use directly even if they are not optimal. The difficulty is to ensure a reasonable computation time to produce the proof and sizes of evaluation and verification keys that are not too substantial.

- the Zerocash protocol (IEEE Security & Privacy 2014) of Ben-Sasson et al., proposes the definition of an arithmetic circuit for verifying the SHA-256 compression function which includes some 30,000 multiplication gates. This provides a proof production time of about 5 seconds (per compression level, verifying the complete hashing function, which comprises numerous iterations of the compression function, will clearly be longer), which remains high and significantly improvable;
- the ZKBoo protocol, presented in the publication "ZKBoo: faster zero-knowledge for Boolean circuits" by Biacomelli, Madsen and Orlandi (Usenix Security 2016) enables better performances (proof in 50 ms, verification in 70 ms) per iteration of the compression function, but the size of the proof is significant (800 kB), especially since it only seems to have been measured on an application of the compression function.

Currently, a proof system that is light but for which the generation takes several seconds is preferred, particularly in the case of entry at an access control gate. Thus, by entering the building the user initiates the generation of the proof (for example if the device 1 is a chip card, he places his finger on the fingerprint sensor 13 in order to implement the steps (a1) and (a)), so that the proof is ready when he reaches the gate: as will be seen, the rest of the method is nearly instantaneous.

The Rest of the Method

In a step (b), the proof entity 1 transmits to the verification entity 2 said zero-knowledge proof, the cryptographic footprint of the candidate biometric data (timestamped if applicable), and the cryptographic footprint of the reference biometric data. Optionally, the user's unique identifier is also transmitted if the proof entity 1 has it, and potentially other public parameters of the proof if necessary (amount of a transaction, identifier of a merchant, etc.), but no other data are transmitted. It especially bears repeating that the biometric data are not transmitted, and thus it can be seen that throughout the entire method (of authentication) no biometric data are ever exchanged.

In a step (c), the data processing means 21 of the verification entity 2 verify that the zero-knowledge proof is valid (if applicable, using the verification key furnished during enrollment), and that the received cryptographic footprint of the reference biometric data belong to said set of cryptographic footprints of reference biometric data in possession of the verification entity 2 (in other words, the user who is being authenticated is truly one of those who are authorized).

If the proof is not valid, the reference biometric data and the candidate biometric data do not match, and therefore it potentially involves identity theft. If the proof is valid but the received cryptographic footprint of the reference biometric data does not belong to said set of cryptographic footprints of reference biometric data in possession of the verification entity number 2, the user is who he claims to be but is not authorized (for example he has left the company and his access has been revoked).

In that case, the user is authenticated and other actions such as opening the access control gate can occur.

It should be noted that if a unique identifier is transmitted, the step (c) can comprise verification that the unique identifier/cryptographic footprint pair match.

As can be seen with such a solution, no sensitive data are stored at the verification entity 2, nor are they transmitted from the proof entity 1 (only unusable cryptographic footprints) and therefore an attack would not compromise the security of the solution nor the personal data of the users.

Verification of the proof in step (c) is not interactive (the verification entity 2 has no need to contact the prover, i.e. the proof entity 1) and is done simply in constant time by verifying that the proof is valid, which shows (with extremely small probability) to the verification entity 2 that the claimed ownership is true, i.e. that the user has candidate biometric data and reference biometric data that match. Thus, it is proven that the identity of the user is confirmed (and that the person has not stolen an identity) in spite of the absence of any biometric data.

Thanks to the proof, confidentiality can be total (since the generation of the proof does not need communication) without the verification entity 2 taking any risk since the proof guarantees it that the proof entity indeed has biometric data. The proof also makes it possible, if applicable, to guarantee that the proof entity indeed had the nonce during generation of the cryptographic footprint of the candidate biometric data, i.e. guaranteeing the freshness thereof.

The proof is short (indeed very short—on the order of a few hundred bytes), so transmitting it with the cryptographic footprints of the document poses no bandwidth problem. Furthermore, verification of said proof is quick (in constant time, a few tens of thousandths of seconds), which does not increase the computation load at the data processing means 21 of the verification entity 2, which must manage many simultaneous authentications. As regards generation of the proof, it requires more computation time, but since step (a) is implemented at the first device 1 which is personal (and is not involved in the authentication of its sole owner), said additional computation time is not problematic, and even welcomed by users who have no problem in devoting a few tens of seconds of operating time of their personal device if it allows them to pass more quickly through the access control gate.

Thus, the present method is optimal for the user as well as for the service provider (the company, airport, Customs, etc.).

Equipment

According to a second aspect, biometric data processing equipment is proposed for the implementation of the method according to the first aspect.

The equipment comprises a proof entity 1 (first device), a verification entity 2 (second device), that are connected, and if applicable, an authority entity 3 (third device).

The proof entity 1, which typically is a user's personal device such as a smartphone, comprises data processing means 11 configured to generate a zero-knowledge proof of the fact that candidate biometric data and reference biometric data match, and to transmit to the verification entity 2 (only) said zero-knowledge proof, a cryptographic footprint of the candidate biometric data (timestamped if applicable), and a cryptographic footprint of the reference biometric data (and optionally a unique identifier of the user).

The proof entity 1 advantageously comprises biometric acquisition means 13 and the data processing means 11 thereof are configured to generate the candidate biometric data from a biometric trait furnished by the biometric acquisition means 13 and the cryptographic footprint of the candidate biometric data obtained (if applicable, the candidate biometric data timestamped using a received nonce).

The verification entity 2 preferably never has reference or candidate biometric data, and only the set of cryptographic footprints of reference biometric data of the authorized users.

It comprises data processing means 21 configured to verify that the zero-knowledge proof received is valid, and that the received cryptographic footprint of the reference biometric data matches one of said set in possession of the verification entity 2.

The authority entity 3 comprises data processing means 31 configured to generate and transmit the reference biometric data to said proof entity.

Computer Program Product

According to a third and a fourth aspects, the invention relates to a computer program product comprising code instructions for execution (in particular on data processing means 11, 21, 31 of the entities 1, 2, 3) of a method according to the first aspect of the biometric data processing invention, as well as storage means readable by computer equipment (a memory of the entities 1, 2, 3) on which said computer program product is located.

The invention claimed is:

1. A biometric data processing method implemented by a proof entity and a verification entity that are connected;
   the proof entity having a candidate biometric data, a reference biometric data, a cryptographic footprint of the reference biometric data, a cryptographic footprint of the candidate biometric data; the verification entity having only a set of cryptographic footprints of reference biometric data of authorized users;
   the method comprising steps of:
   generation by data processing means of the proof entity of a zero-knowledge proof of the fact that the candidate biometric data and the reference biometric data match;
   (a) transmission to the verification entity of said zero-knowledge proof, of the cryptographic footprint of the candidate biometric data, and of the cryptographic footprint of the reference biometric data;
   (b) verification by data processing means of the verification entity that:
   the zero-knowledge proof is valid, and
   the received cryptographic footprint of the reference biometric data belongs to said set of cryptographic footprints of reference biometric data in the possession of the verification entity.

2. The method according to claim 1, wherein the proof entity initially has only the reference biometric data and the cryptographic footprint of the reference biometric data, the method comprising the implementation by the data processing means of the proof entity of a preliminary step (a1) of:
   generation of the candidate biometric data from a biometric trait furnished by biometric acquisition means of the proof entity, and
   generation of the cryptographic footprint of the candidate biometric data obtained.

3. The method according to claim 2, wherein step (a1) comprises the time-stamping by the data processing means of the proof entity of the candidate biometric data using a time marker, the cryptographic footprint generated in step (a1) and transmitted in step (b) being that of the time-stamped candidate biometric data.

4. The method according to claim 3, wherein said time marker is a nonce generated by the data processing means of the verification entity and transmitted to the proof entity.

5. The method according to claim 3, wherein said zero-knowledge proof of the fact that the candidate biometric data and the reference biometric data match is a zero-knowledge proof of the fact that, given two cryptographic footprints and a time marker, there are reference biometric data and candidate biometric data such that:
   the reference biometric data and the time-stamped candidate biometric data using the given time marker have the given cryptographic footprints for respective cryptographic footprints,
   the reference biometric data and the candidate biometric data match.

6. The method according to claim 2, comprising an earlier implemented step (a0) of:
   generation by data processing means of an authority entity of said reference biometric data from a reference biometric trait, and transmission thereof to the proof entity;
   addition to said set of cryptographic footprints of reference biometric data of authorized users of the cryptographic footprint of the generated reference biometric data.

7. The method according to claim 6, wherein step (a0) further comprises the generation by the data processing means of the authority entity of the cryptographic footprint of said generated reference biometric data, and the transmission thereof to the proof entity; and the retransmission by the proof entity to the verification entity of said generated cryptographic footprint of said generated reference biometric data, in order to add reference biometric data of authorized users to said set of cryptographic footprints.

8. The method according to claim 1, wherein the proof entity is a personal electronic device of an individual who is among the authorized users, such as a mobile device or chip card, the reference biometric data stored in the proof entity being that of said individual.

9. The method according to claim 8, wherein each of said authorized users the proof entity is personal electronic device of an individual, such as a mobile device or chip card, the reference biometric data stored in the proof entity being that of said individual.

10. The method according to claim 6, wherein the proof entity is a personal electronic device of an individual who is among the authorized users, such as a mobile device or chip card, the reference biometric data stored in the proof entity being that of said individual; and wherein the reference biometric trait from which said reference biometric data is generated in step (a0) is that of the individual having the proof entity.

11. The method according to claim 1, wherein the zero-knowledge proof is a cryptographic object of the zkSNARK type.

12. The method according to claim 1, wherein step (a) comprises the preliminary verification that the candidate biometric data and the reference biometric data match; the candidate biometric data and the reference biometric data matching if the distance thereof according to a given comparison function is less than a predetermined threshold.

13. A biometric data processing assembly comprising a proof entity and a verification entity that are connected, characterized in that:

the proof entity comprises data processing means configured to generate a zero-knowledge proof of the fact that a candidate biometric data and a reference biometric data match, and to transmit to the verification entity said zero-knowledge proof, a cryptographic footprint of the candidate biometric data, and a cryptographic footprint of the reference biometric data;

the verification entity comprises data processing means configured to verify that the zero-knowledge proof is valid, and that the received cryptographic footprint of the reference biometric data belongs to a set of cryptographic footprints of reference biometric data of authorized users in the possession of the verification entity.

14. The assembly according to claim 13, wherein the proof entity comprises biometric acquisition means, the data processing means of the proof entity being further configured to generate the candidate biometric data from a biometric trait furnished by the biometric acquisition means and the cryptographic footprint of the candidate biometric data obtained.

15. A non-transitory computer program product comprising code instructions for the execution of a method according to claim 1 of biometric data processing, when said method is executed on a computer.

16. A non-transitory storage means readable by computer equipment on which a computer program product comprises code instructions for the execution of a method according to claim 1 of biometric data processing.

* * * * *